(12) United States Patent
Burch et al.

(10) Patent No.: US 7,191,974 B2
(45) Date of Patent: Mar. 20, 2007

(54) WINDING MACHINE INCLUDING ACTUATED COLLET

(75) Inventors: Jerry C. Burch, Waynesville, OH (US); Gary Ramage, Chatsworth, CA (US)

(73) Assignee: Globe Motors, Inc., Dayton, OH (US)

( * ) Notice: Subject to any disclaimer, the term of this patent is extended or adjusted under 35 U.S.C. 154(b) by 0 days.

(21) Appl. No.: 11/347,948

(22) Filed: Feb. 6, 2006

(65) Prior Publication Data

US 2006/0124798 A1   Jun. 15, 2006

Related U.S. Application Data

(63) Continuation of application No. 10/942,509, filed on Sep. 16, 2004, now Pat. No. 7,028,942.

(60) Provisional application No. 60/505,149, filed on Sep. 23, 2003.

(51) Int. Cl.
*H02K 15/085* (2006.01)
(52) U.S. Cl. ............................... 242/432.2; 242/432.4; 29/596
(58) Field of Classification Search .. 242/432.2–432.6; 29/596, 605
See application file for complete search history.

(56) References Cited

U.S. PATENT DOCUMENTS

| | | | |
|---|---|---|---|
| 3,082,966 A | 3/1963 | Frederick | |
| 4,498,636 A | 2/1985 | Boesewetter et al. | |
| 4,616,788 A * | 10/1986 | Finegold | 242/433.3 |
| 4,791,271 A | 12/1988 | Thompson et al. | |
| 5,845,863 A | 12/1998 | Takubo et al. | |
| 5,860,615 A | 1/1999 | Burch | |
| 5,964,429 A | 10/1999 | Burch et al. | |
| 6,254,027 B1 | 7/2001 | Kunou | |
| 6,533,208 B1 | 3/2003 | Becherucci et al. | |

(Continued)

FOREIGN PATENT DOCUMENTS

CH   430 857 A   2/1967

(Continued)

*Primary Examiner*—Emmanuel Marcelo
*Assistant Examiner*—Evan H. Langdon
(74) *Attorney, Agent, or Firm*—Stevens & Showalter LLP

(57) ABSTRACT

An apparatus for winding the stator for a dynamoelectric machine is provided. The apparatus includes a stator nest located on a mounting member, the stator nest including a front side for receiving a stator and a back side located opposite from the front side. The stator nest defines a horizontal longitudinal axis and includes a collet located at the front side for engaging and gripping the outer surface of a stator positioned within the collet. A collet actuator is located on a side of the mounting member opposite from the front side, and the collet actuator actuates the collet to engage with and disengage from the stator. A winding tool extends through the stator nest from the back side toward the front side. A reciprocating driver is connected to the winding tool for driving the winding tool in reciprocating movement relative to the stator nest. An oscillating driver connected to the winding tool drives the winding tool in oscillating movement. A wire feeder for feeding wire through the winding tool is supported adjacent the oscillating driver and is supported for reciprocating movement with the winding tool.

12 Claims, 7 Drawing Sheets

| U.S. PATENT DOCUMENTS | | | FOREIGN PATENT DOCUMENTS | | |
|---|---|---|---|---|---|
| 6,616,082 B2 | 9/2003 | Burch | EP | 0 267 865 A1 | 5/1988 |
| 6,622,954 B2 | 9/2003 | Komuro et al. | EP | 0 955 716 A2 | 11/1999 |
| 6,732,971 B2 | 5/2004 | Stratico et al. | JP | 61111279 | 5/1986 |
| 2002/0043657 A1 | 4/2002 | Ray | | | |
| 2002/0060264 A1 | 5/2002 | Burch | * cited by examiner | | |

WINDING MACHINE INCLUDING ACTUATED COLLET

CROSS REFERENCE TO RELATED APPLICATIONS

The present application is a continuation of U.S. application Ser. No. 10/942,509, filed Sep. 16, 2004 now U.S. Pat. No. 7,028,942, which claims the benefit of U.S. Provisional Application No. 60/505,149, filed Sep. 23, 2003, both of which are incorporated herein by reference.

BACKGROUND OF THE INVENTION

1. Field of the Invention

The present invention relates generally to stator winding and, more particularly, to an apparatus and method for winding coils on stators for dynamo-electric machines, including an improved winding apparatus for providing improved processing speeds.

2. Description of the Prior Art

Field winding coils for stators are generally placed on the radially inwardly extending teeth of a stator by either preforming the coils and then pressing the preformed coils over the stator teeth, or by winding the coils directly onto the stator teeth. In the process where the coils are preformed, the coils are pushed onto the stator by a coil pusher which forcibly pushes the coils over the teeth of the stator, and a forming tool, or forming tools, may be provided to shape the wire in the stator slots and around the ends of the teeth in order to compactly position the coils on the stator. In such a construction, excess wire must be provided for the preformed coils in order to accommodate the necessary distortions of the coils as they are pressed over and around the stator teeth. Accordingly, such a construction has been found to provide an inefficient amount of wire, as well as result in a larger stator dimension as a result of the excess coil wire extending around the end faces of the teeth for the stator.

In the alternative construction for field winding, wire is fed from a winding spindle or tool directly onto a stator wherein the wire is successively wound around the stator teeth, and the efficiency of the winding operation is substantially dependent upon the ability to direct the wire to desired locations on the teeth as it is fed from the winding spindle. Such a device for feeding wire onto the stator to form the coils directly thereon is disclosed in U.S. Pat. No. 5,964,429, which discloses a winding tool which is supported for vertical reciprocating and rotating movement relative to a stator. The winding tool includes a plurality of forming racks which are adapted to move radially outwardly from the winding tool in order to press the end portions of the coil windings radially outwardly and thereby facilitate placement of additional wire within the slots of the stator.

A further winding tool for forming coils directly onto a stator is disclosed in U.S. Pat. No. 6,616,082 which describes a vertical winding machine including a winding tool which moves in reciprocating movement through the stator as wire is fed onto the stator teeth. During movement of the winding tool, a drifting tool is moved into engagement with the wire coils being formed such that a drifting operation is performed simultaneously with movement of the winding tool to place wire around the stator teeth.

There is a continuing need for a winding tool which efficiently winds wire onto stators and which is capable of reducing the winding time through increased apparatus operation speeds.

SUMMARY OF THE INVENTION

In accordance with one aspect of the invention, an apparatus for winding the stator for a dynamoelectric machine is provided, the apparatus comprising a stator nest located on a mounting member, the stator nest including a front side for receiving a stator and a back side located opposite from the front side. The stator nest comprises a collet located at the front side for engaging and gripping the outer surface of a stator positioned within the collet. A collet actuator is located on a side of the mounting member opposite from the front side, where the collet actuator actuates the collet to engage with and disengage from the stator. A winding tool extends through the stator nest from the back side toward the front side. The winding tool includes a wire passage for guiding wire to the stator located in the collet. In addition, a reciprocating driver is connected to the winding tool for driving the winding tool in reciprocating movement relative to the stator nest.

In accordance with another aspect of the invention, an apparatus for winding the stator for a dynamoelectric machine is provided, the apparatus comprising a stator nest located on a mounting member, the stator nest including a front side for receiving a stator and a back side located opposite from the front side. The stator nest comprises a collet located at the front side for engaging and gripping the outer surface of a stator positioned within the collet. A collet closer is located in spaced relation to the stator nest. In addition, a winding tool extends through the stator nest from the back side toward the front side, and the winding tool includes a winding head located within the collet for feeding wire to the stator positioned within the collet.

In accordance with a further aspect of the invention, an apparatus for winding a stator for a dynamoelectric machine is provided, the apparatus comprising a stator nest including a front side for receiving a stator and a back side located opposite from the front side. The stator nest comprises a collet located at the front side for engaging and gripping the outer surface of a stator positioned within the collet. A collet closer is located in spaced relation to the stator nest adjacent the back side of the stator nest. A winding tool extends through the stator nest from the back side toward the front side, and the winding tool includes a winding head located within the collet for feeding wire to the stator positioned within the collet. In addition, an articulated arm is provided having an end for gripping and moving the stator from a location spaced from the collet to a location in engagement with the collet.

Other features and advantages of the invention will be apparent from the following description, the accompanying drawings and the appended claims.

DETAILED DESCRIPTION OF THE INVENTION

Figure 1:
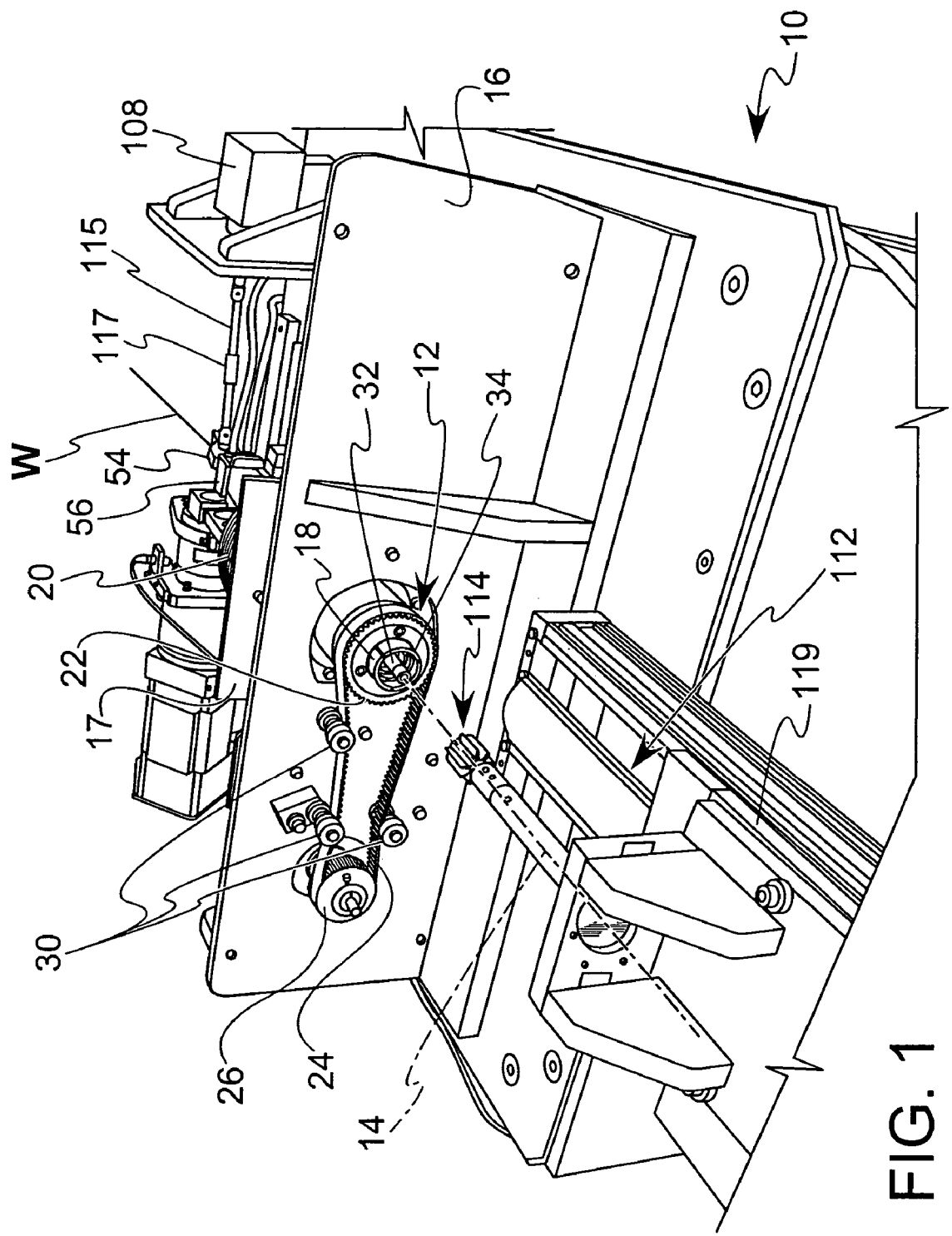
FIG. 1 is a front perspective view of a winding apparatus constructed in accordance with the present invention.

Referring to FIG. 1 the present invention provides a horizontal winding apparatus for winding stators for dynamoelectric machines. The apparatus comprises a support base 10 mounting a generally cylindrical stator nest 12 defining a horizontally extending longitudinal axis 14. In particular, the stator nest 12 is supported to the support base 10 by a vertical mounting plate 16.

The stator nest 12 comprises a collet 18 sized to receive a stator for engagement with a cylindrical exterior surface of the stator. In addition, an actuator 20 for the collet 18 is provided mounted to a collet mount 17 for actuating the collet 18 between a closed and an open position for engaging and disengaging with a stator located within the collet 18. The actuator 20 preferably comprises an air actuated collet closer, such as an air collet closer manufactured by Dunham Tool Company of New Fairfield, Conn.

Figure 2:
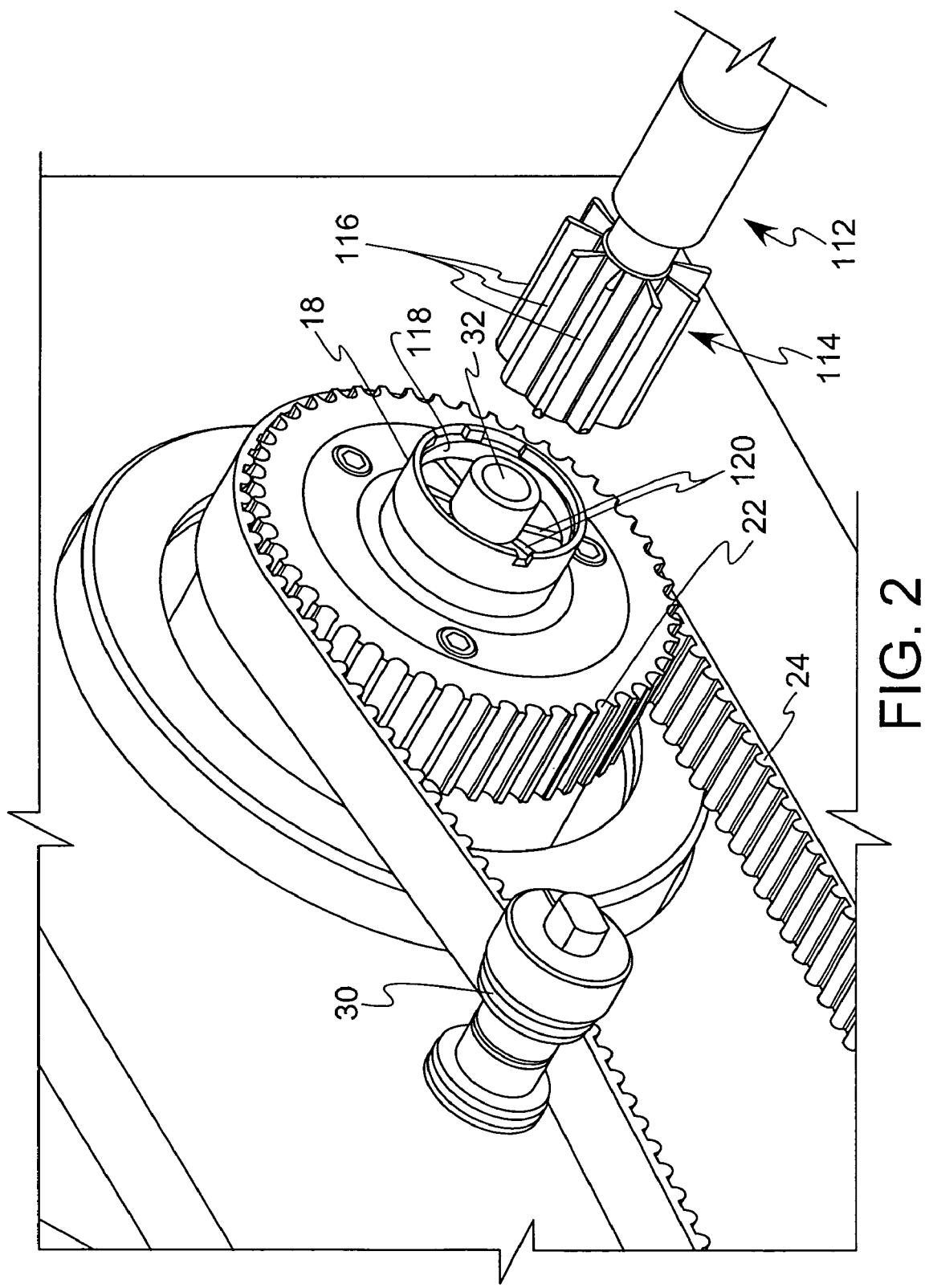
FIG. 2 is an enlarged perspective view of the collet for the winding apparatus of FIG. 1.

Referring further to FIG. 2, the collet 18 is supported for rotation about the longitudinal axis 14 and includes an exterior toothed member defining a collet gear 22. A toothed drive belt 24 extends around the collet gear 22 and passes around a drive sprocket 26 which is supported on the vertical mounting plate 16. The drive sprocket 26 is driven by a servo motor 28 (FIG. 3), defining a nest driver, to cause the collet 18 to be driven in rotational movement to position the stator nest 12 at precise rotational positions, as specified by a programmable controller (not shown). For example, the stator nest 12 may be rotated to a different rotational position prior to each coil winding operation performed by a winding tool 32. One or more belt tensioning members 30 are provided along the top and bottom runs of the drive belt 24 to stabilize and maintain tension on the drive belt 24.

Figure 4:
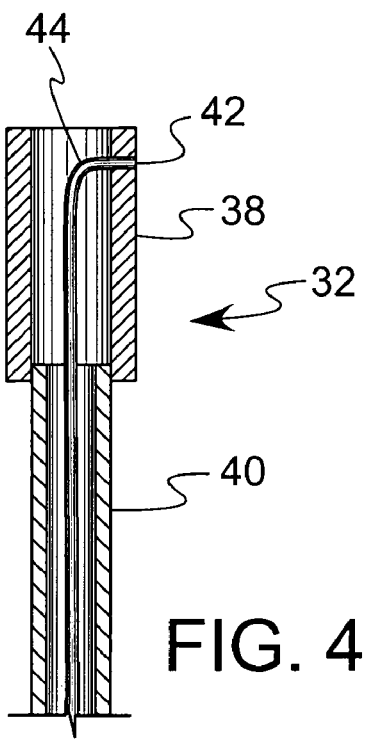
FIG. 4 is a cross sectional view through the end of the winding tool.

The winding tool 32 (FIG. 4) extends through the stator nest 12 in a direction from a back side toward a front side 34 of the stator nest 12. The winding tool 32 includes a winding head 38 sized to fit relatively closely within the interior diameter of a stator 118 supported within the stator nest 12, and a rigid winding tool shaft 40 attached to one end of the winding head 38. The winding head 38 and winding tool shaft 40 are both formed as hollow members for permitting passage of winding wire therethrough, and the winding head 38 defines at least one wire feed opening 42 extending radially through its side wall for passage of wire from the winding head 38 to a stator 118 held in the stator nest 12. Wire is guided through the winding tool 32 to the wire feed opening 42 by a flexible guide tube 44, such as a plastic tube, extending though the winding tool shaft 40 and winding head 38. It should be understood that although only one wire feed opening 42 and guide tube 44 are shown, a plurality of wire feed openings and guide tubes may be provided, one for each wire to be fed by the winding tool 32 during a stator winding operation.

Figure 3:
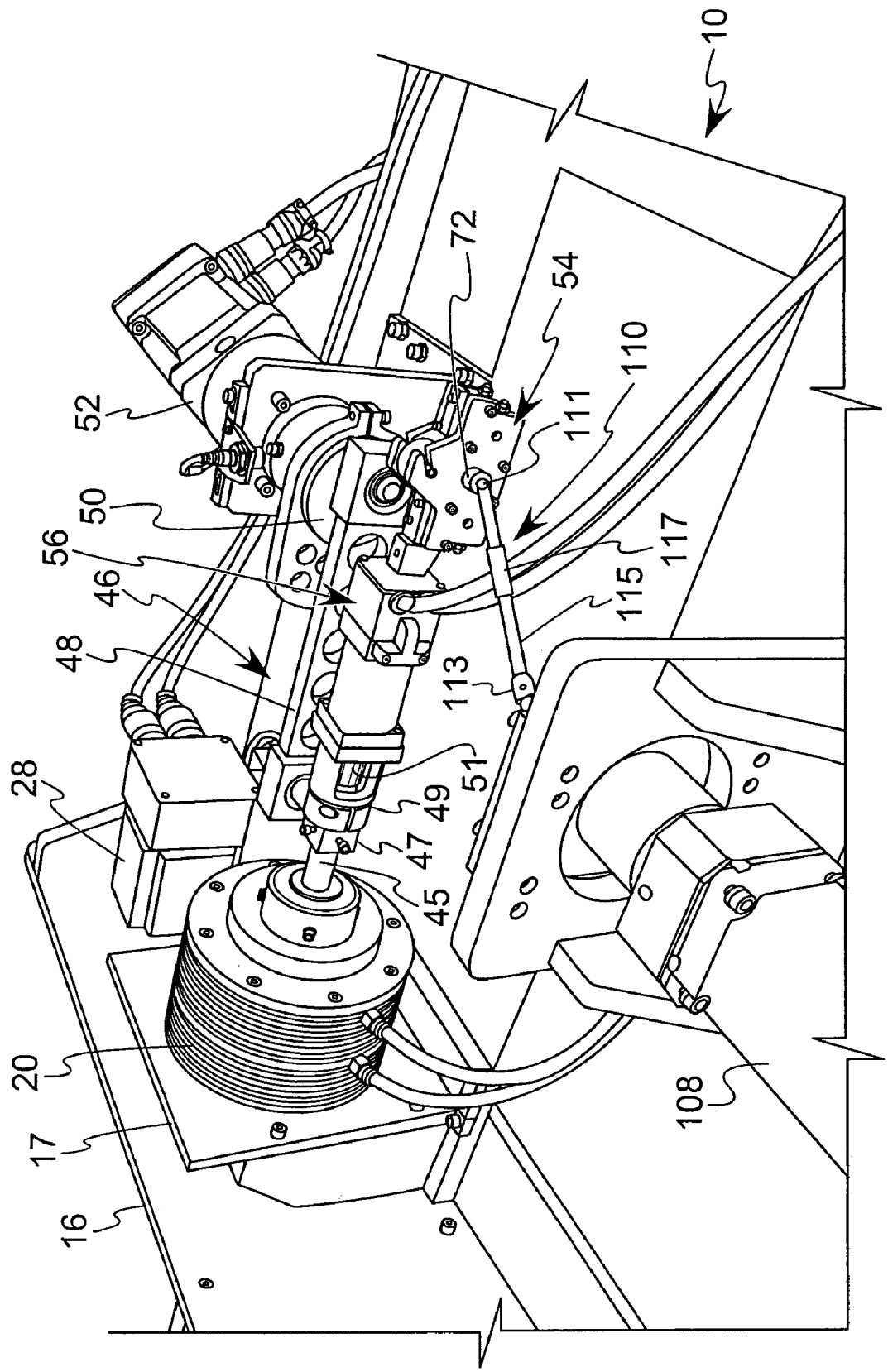
FIG. 3 is a rear perspective view of the winding apparatus of FIG. 1.

Referring to FIG. 3, the winding tool 32 extends rearwardly from the stator nest 12 and extends through a support tube 45. The support tube 45 is connected to a clamp plate 47 which is attached to a reciprocating structure 46 comprising a reciprocating arm 48 having one end attached to an eccentric drive member 50 driven by a servo motor 52 supported on the base support 10. A coupling housing 49 is attached to the clamp plate 47, for reciprocating movement with the clamp plate 47, and further supports an oscillating drive motor 56. A torque transmitting coupling 51 within the coupling housing 49 transfers rotational movement from the drive motor 56 to the winding tool shaft 40 to provide controlled rotation of the winding head 38. Accordingly, the winding tool shaft 40 is supported within the support tube 45 for reciprocating movement with the reciprocating arm 48 and support tube 45, and is further supported for rotating or oscillating movement to provide reciprocating and oscillating movement to the winding head 38.

A wire feeder 54 is supported at an end of the drive motor 56 opposite from the coupling housing 49 for pushing wire W through the winding tool 32 and out of the wire feed opening 42. The wire feeder 54 reciprocates with the drive motor 56 and the coupling housing 49, such that the wire feeder 54 is located in substantially fixed relationship to the winding tool 32.

The oscillating drive motor 56 comprises a servo motor defining a rotational axis which substantially coincides with the longitudinal axis 14, and which is connected to the winding tool shaft 40 to actuate the winding tool shaft 40 in controlled rotation during a winding operation. In particular, the winding tool shaft 40 may be rotated to form end turns of wire at the opposing ends of the stator teeth, and further may be rotated to facilitate placement of wire within skewed slots where it is necessary to both rotate and move the winding tool 32 longitudinally as the wire is fed into the stator slots. The oscillating drive motor 56 is positioned such that it provides a direct rotational drive to the winding tool 32, without intermediate connecting structure, such as gears or belts, to transmit the rotational movement of the servo motor, resulting in a reduction in weight and corresponding reduction in inertia of the oscillating members associated with the winding tool 32.

Figure 5:
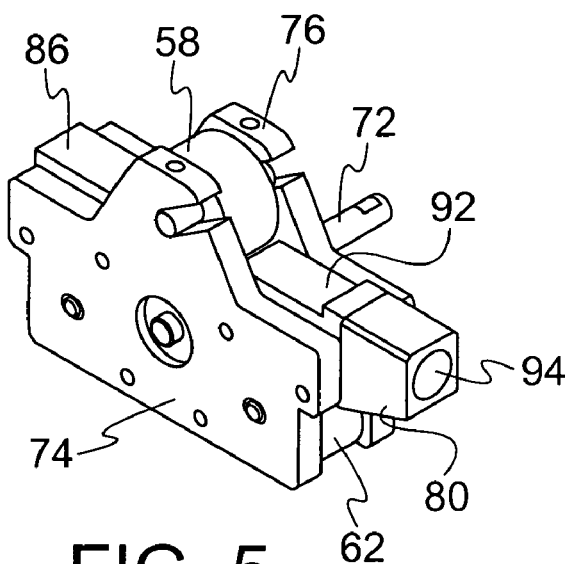
FIG. 5 is a perspective view of a wire feed mechanism for the winding apparatus of FIG. 1.
Figure 6:
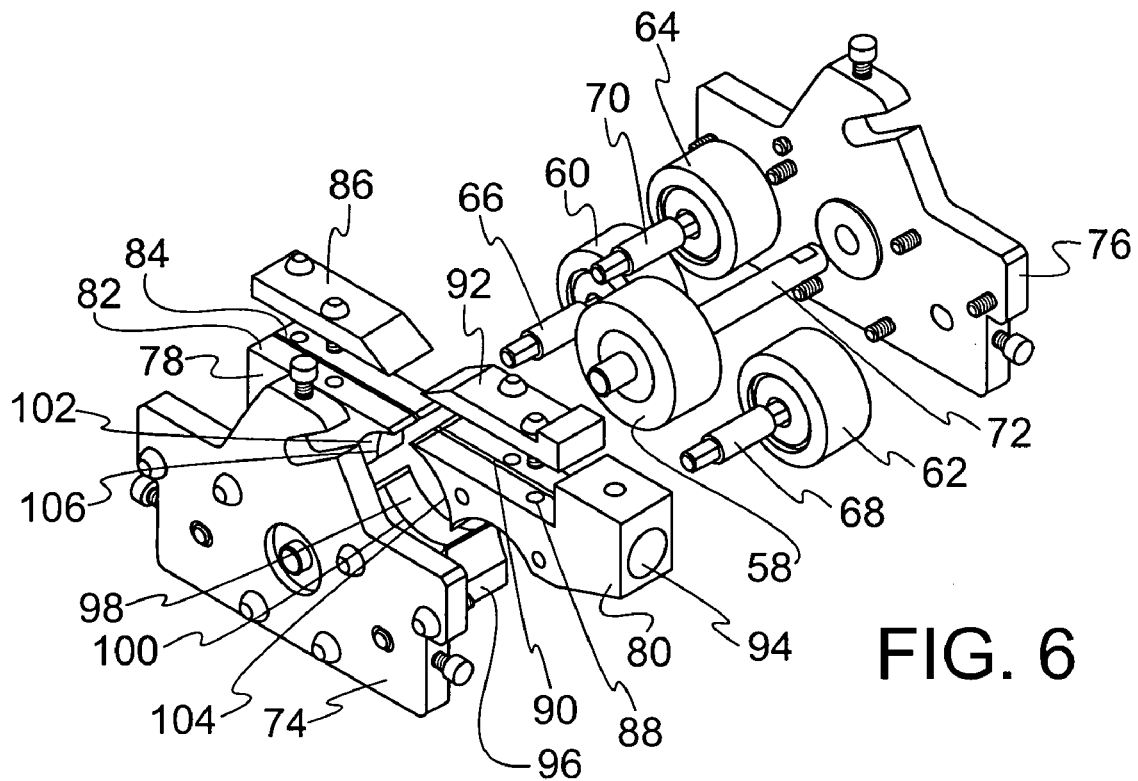
FIG. 6 is an exploded view of the wire feed mechanism of FIG. 4.

Referring to FIGS. 5 and 6, the wire feeder 54 comprises a steel drive roller 58 and a set of three pressure rollers 60, 62, 64 in cooperating engagement with the drive roller 58. The pressure rollers 60, 62, 64 comprise idler rollers supported on respective idler shafts 66, 68, 70 and each of the pressure rollers 60, 62, 64 include a resilient outer surface, such as a rubber surface, for contacting the steel circumferential surface of the drive roller 58. The drive roller 58 is supported on a drive shaft 72 for driving the roller 58 in rotation. The idler shafts 66, 68, 70 and drive shaft 72 are supported between two side plates 74, 76 defining opposing sides of the wire feeder 54.

A wire entry guide 78 is located between the side plates 74, 76 on an entry side of the wire feeder 54 and a wire exit guide 80 is located on an exit side of the wire feeder 54. The wire entry guide 78 includes an upper surface 82 defining a wire guide groove 84, and an entry cover plate 86 positioned over the upper surface 82 to cooperate with the groove 84 in defining a passage for wire to pass into the wire feeder 54 toward the drive roller 58. Similarly, the wire exit guide 80 includes an upper surface 88 defining a wire guide groove 90, and an exit cover plate 92 positioned over the upper surface 88 to cooperate with the groove in defining a passage for wire to pass from the drive roller 58 and out of the wire feeder 54 through an exit opening 94. The wire passes out of the exit opening 94 and into the guide tube 44, passing through the center of the drive motor 56 and into the winding tool shaft 40 for guiding wire to the wire feed opening 42 of the winding tool 32.

A lower wire guide 96 is also provided, located below the drive roller 58, and includes a curved surface 98 conformed to the outer surface of the drive roller 58 and defining a wire guide groove 100 for guiding and maintaining the position of wire passing around the drive roller 58. In addition, the wire entry guide 78 and wire exit guide 80 each include respective curved surfaces 102, 104. Further, the surface 102 defines a wire guide groove 106 and the surface 104 similarly includes a wire guide groove (not shown) for guiding and maintaining the position of wire passing around the drive roller 58.

Wire enters the wire feeder 54 through the passage defined in the wire entry guide 78 and is wrapped around the drive roller 58 such that the wire encircles the drive roller 58 three times. The wire then passes from the drive roller 58 to the passage defined by the wire exit guide 80. By wrapping the wire around the drive roller 58, the wire is maintained in firm frictional engagement with the drive roller 58, substantially preventing slippage of the wire relative to the drive roller 58 during rotation of the drive roller 58 and during oscillation of the wire feeder 54 relative to a wire supply (not shown).

Referring to FIG. 3, the drive roller 58 is driven in rotation by sensing servo motor 108 which is mounted to the base support 10, and which is connected to the wire feeder drive shaft 72 by an angle drive connection 110. The sensing servo motor 108 uses sensed conditions related to operation of the motor 108 to consistently maintain operation of the motor 108 at a desired speed. The angle drive connection 110 is illustrated as comprising a pair of universal joints 111, 113, a shaft portion 115 and a sliding spline shaft connection 117 along the shaft portion 115 to accommodate reciprocating movement of the wire feeder 54 relative to the servo motor 108. The angle drive connection 110 permits the servo motor 108 to be mounted separate from the oscillating parts associated with the wire feed and thereby reduces the amount of weight, and associated inertia, that must be actuated by the servo motor 52 for the reciprocating structure 46. It should be understood that the term "angle drive connection" is intended to encompass any drive structure which permits transmission of rotational power from the motor 108 to the wire feeder 54 along a path which is not a direct line between the rotational axis of the motor 108 and the rotational axis of the drive shaft 72 of the wire feeder 54, including flexible drive shafts and similar structures.

Referring to FIGS. 1 and 2, a drift tool structure 112 is provided including a drift tool head 114 located adjacent the front side 34 of the stator nest 12. The drift tool head 114 comprises a plurality of radially extending drift tool blades 116. In operation, the drift tool head 114 is actuated by a linear servo motor 119 for reciprocating movement toward and away from a stator 118 positioned within the stator nest 12 to move the blades 116 into the slots of the stator 118 for engaging and forming wire wound around the stator teeth 120. The drift tool head 114 may be moved into and out of engagement with the stator 118 in synchronous movement with the winding tool 32, or may be moved into engagement with the stator 118 intermittently at predetermined intervals in the winding operation. The structure and operation of the drift tool 112 may be similar to the operation of the drift tool disclosed in U.S. Pat. No. 6,616,082, which patent is incorporated herein by reference.

Figure 7:
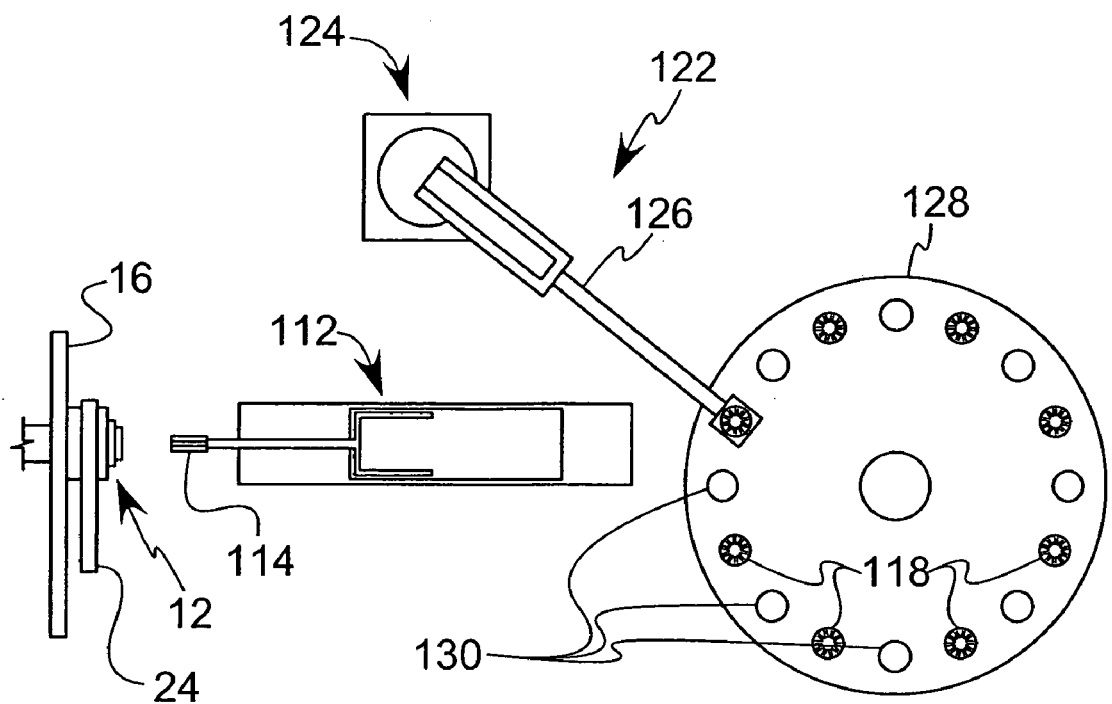
FIGS. 7 and 8 are diagrammatic plan views of a robotic arrangement for automatically moving stators between a stator supply location and the winding apparatus of FIG. 1.
Figure 8:
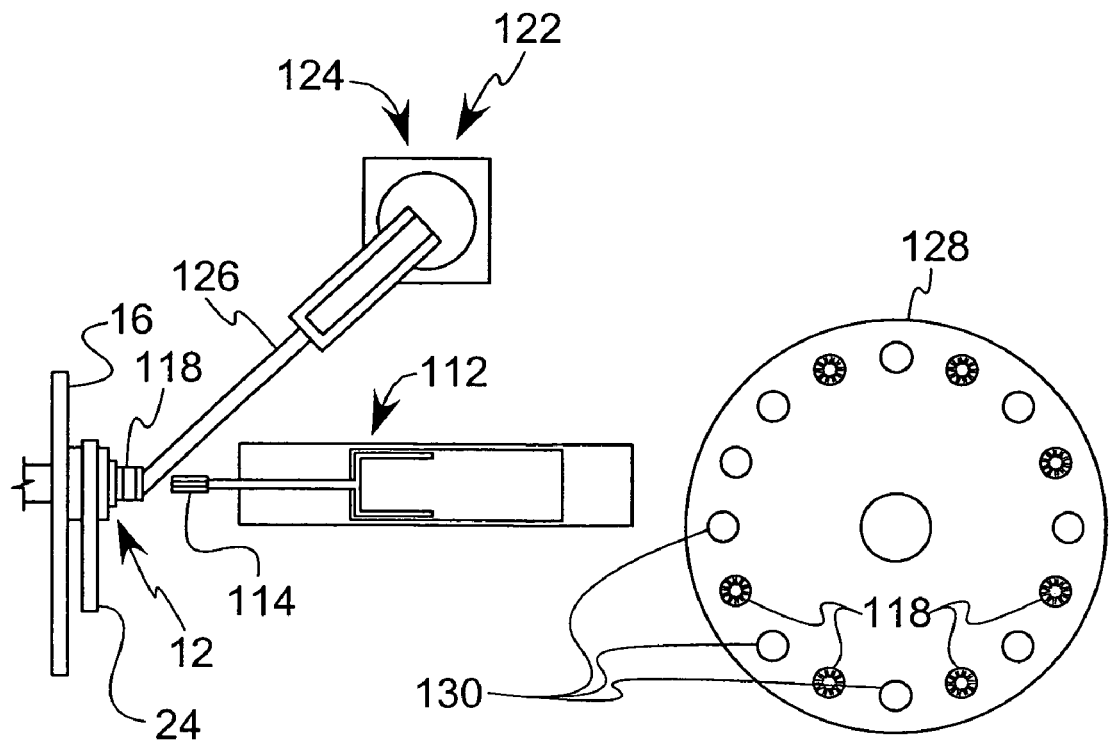
Figure 9:
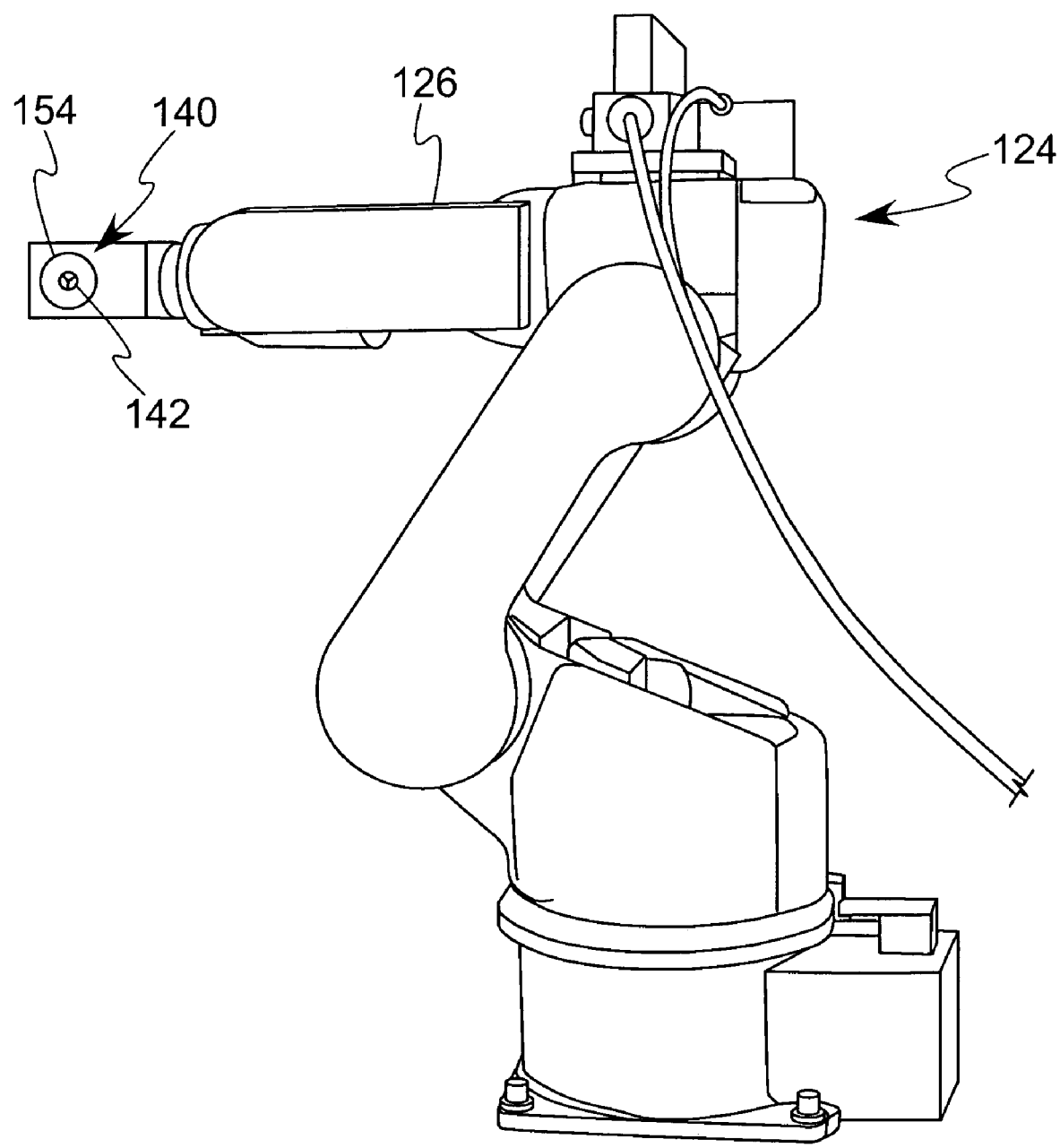
FIG. 9 is a side view of a robot for transferring stators to the winding apparatus.
Figure 10:
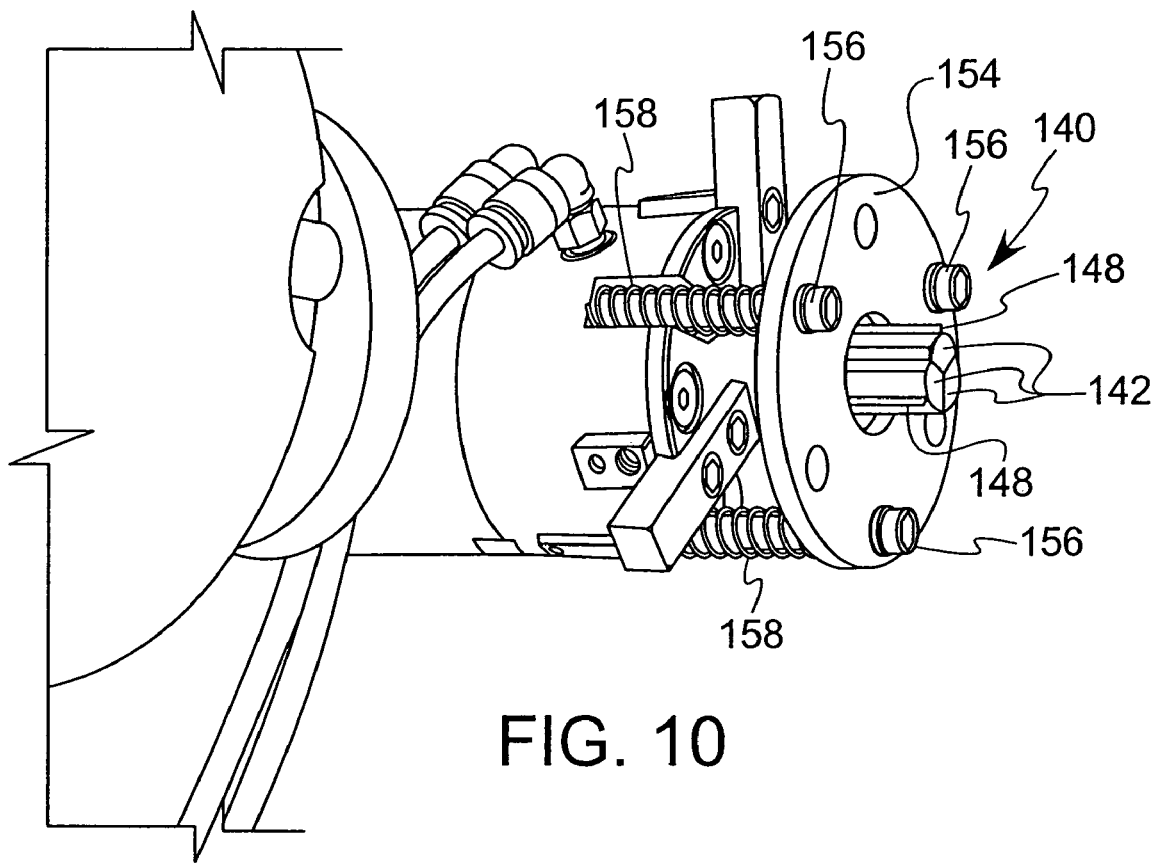
FIG. 10 is a perspective view of a stator pickup member.
Figure 11:
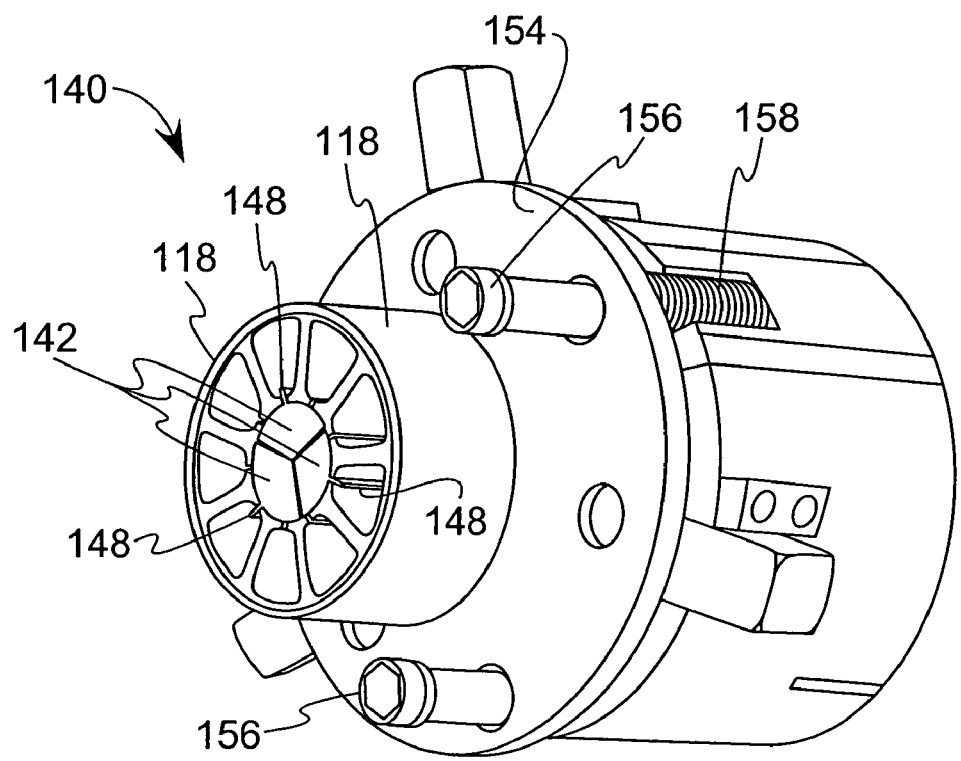
FIG. 11 is a perspective view of the stator pickup member engaged with a stator.

Referring to FIGS. 7 and 8, a transfer structure 122 for transferring stators 118 to and from the stator nest 12 is illustrated diagrammatically. The transfer structure 122 comprises a robot 124 (see also FIG. 9) having an articulated arm 126 for moving stators 118 from a stator supply or tray 128 to the stator nest 12 in preparation for a winding operation, and for moving the wound stators 118 from the stator nest back to the tray 128. The tray 128 preferably comprises a turntable having a plurality of shallow circular slots 130 sized to receive the stators 118, the turntable being actuated for rotation by the controller for the system to bring a particular slot into position for transfer of a stator to or from the robot arm 126. The robot 124 preferably comprises a Motoman SV3X robot having a stator pickup member 140 on the end of the arm 126, such as a pickup member 140 having a plurality radially movable jaw members 142 (FIG. 10). For example, the pickup member 140 may comprise a pneumatically actuated 3-jaw gripper available from Process Equipment Co., Robotic Accessories Division, of Tipp City, Ohio. Each jaw member 142 preferably includes a blade portion 148 for engagement with the inside of the stator 118, the blade portions 148 engaging with the stator slots for maintaining a desired rotational orientation of the stator 118 as it is loaded into the stator nest 12. As seen in FIG. 11, the radially movable members 142 are engaged outwardly against the interior of a stator 118. In addition, it can be seen that a spring biased plate 154, supported on pins 156, is biased back against springs 158 when the stator 118 is in position on the radially movable members 142. The spring biased plate 154 acts to push the stator 118 off the pickup member 140 when the radially movable members 142 are retracted inwardly in order to ensure positive transfer of the stator 118 to either the collet 18 or to the tray 128.

FIG. 6 diagrammatically illustrates the robot arm 126 extended toward the tray 128 to pick up a stator 118 in preparation for transfer to the stator nest 12 prior to a winding operation. It should be noted that every other slot 130 in the tray contains a stator 118, leaving empty slots 130 in between for receiving wound stators 118.

FIG. 7 diagrammatically illustrates the robot arm 126 transferring a stator 118 to the stator nest 12. Upon completion of a stator winding operation, the robot arm 126 will return to the position illustrated in FIG. 7 to remove the stator 118 from the stator nest 12 and subsequently transfer the wound stator 118 to one of the empty slots 130 in the tray 128.

It should be apparent that provision of the robot 124 to move the stators 118 between a supply and collection tray 128 and the winding machine collet 18 reduces the time required between winding operations. Further, it should be understood that the provision of a winding machine in which horizontal reciprocation of the winding tool 32 is implemented, rather than the vertical movement of prior machines, substantially reduces the inertial forces resulting from moving winding apparatus components against the force of gravity. Also, the inertial forces associated with movement of the winding tool 32 are additionally reduced by positioning the wire feed motor 108 apart from the wire feeder 54 with an angle drive connection, and by providing the oscillating drive motor 56 in line with the winding tool shaft 40.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for winding a stator for a dynamoelectric machine, the apparatus comprising:
   a stator nest located on a mounting member, the stator nest including a front side for receiving a stator and a back side located opposite from the front side;
   the stator nest comprising a collet located at the front side for engaging and gripping the outer surface of a stator positioned within the collet;
   a winding tool extending through the stator nest from the back side toward the front side, the winding tool including a wire passage for guiding wire to the stator located in the collet;
   a reciprocating driver connected to the winding tool for driving the winding tool in reciprocating movement relative to the stator nest;
   the winding tool including a winding tool shaft extending from a connection to the reciprocating driver to the stator nest, and the winding tool shaft passing through the collet actuator between the reciprocating driver and the stator nest;
   a collet actuator located on a side of the mounting member opposite from the front side, the collet actuator actuating the collet to engage with and disengage from the stator; and
   wherein the collet is rotatable relative to the mounting member, and including a nest driver connected to the collet for driving the collet in rotational movement.

2. The apparatus of claim 1, including an oscillating driver connected to the winding tool shaft for driving the winding tool in oscillating movement.

3. The apparatus of claim 1, including a wire feeder for drawing wire from a wire supply at a controlled rate and for pushing wire through the winding tool.

4. The apparatus of claim 1, wherein the collet actuator comprises an air actuated collet closer.

5. The apparatus of claim 1, including a tray containing a plurality of stators, and an articulated robot arm for removing a stator from the tray and placing it within the collet.

6. The apparatus of claim 5, wherein the robot arm includes an end portion comprising a plurality of radially moveable fingers, the fingers being moveable radially outwardly for engaging within the stator, and the fingers being moveable radially inwardly for disengaging from the stator.

7. An apparatus for winding a stator for a dynamoelectric machine, the apparatus comprising:
   a stator nest located on a mounting member, the stator nest including a front side for receiving a stator and a back side located opposite from the front side;
   the stator nest comprising a collet located at the front side for engaging and gripping the outer surface of a stator positioned within the collet;
   a winding tool extending through the stator nest from the back side toward the front side, the winding tool including a wire passage for guiding wire to the stator located in the collet;
   a reciprocating driver connected to the winding tool for driving the winding tool in reciprocating movement relative to the stator nest; the winding tool including a winding tool shaft extending from a connection to the reciprocating driver to the stator nest, and the winding tool shaft passing through the collet actuator between the reciprocating driver and the stator nest;
   a collet closer for actuating the collet to engage with and disengage from the stator, the collet closer including a collet actuator actuated by a controller and located on a side of the mounting member opposite from the front side, the collet actuator actuating the collet to engage with and disengage from the stator; and
   wherein the collet is rotatable relative to the mounting member, and including a nest driver connected to the collet for driving the collet in rotational movement.

8. The apparatus of claim 7, wherein the collet closer is located in axially spaced relation to the stator nest.

9. The apparatus of claim 8, wherein the collet closer comprises an air actuated collet closer.

10. The apparatus of claim 7, including a wire feeder for drawing wire from a wire supply at a controlled rate and for pushing wire through the winding tool.

11. An apparatus for winding a stator for a dynamoelectric machine, the apparatus comprising:
    a stator nest located on a mounting member, the stator nest including a front side for receiving a stator and a back side located opposite from the front side;
    the stator nest comprising a collet located at the front side for engaging and gripping the outer surface of a stator positioned within the collet;
    a winding tool extending through the stator nest from the back side toward the front side, the winding tool including a wire passage for guiding wire to the stator located in the collet;
    a reciprocating driver connected to the winding tool for driving the winding tool in reciprocating movement relative to the stator nest;
    the winding tool including a winding tool shaft extending from a connection to the reciprocating driver to the stator nest, and the winding tool shaft passing through the collet actuator between the reciprocating driver and the stator nest;
    a collet actuator located on a side of the mounting member opposite from the front side, the collet actuator actuating the collet to engage with and disengage from the stator;
    wherein the collet is rotatable relative to the mounting member, and including a nest driver connected to the collet for driving the collet in rotational movement; and
    an articulated arm having an end for gripping and moving the stator from a location spaced from the collet to a location in engagement with the collet, wherein the end of the articulated arm includes radially moveable fingers that are actuated radially outwardly to engage inner surfaces of the stator, the radially moveable fingers being moveable out of the stator with the articulated arm when the stator is positioned within the collet prior to a winding operation.

12. The apparatus of claim 11, wherein the end of the articulated arm positions the stator for engagement of the collet on the outer surface of the stator.

* * * * *